United States Patent
Tröster

(10) Patent No.: US 7,194,860 B2
(45) Date of Patent: Mar. 27, 2007

(54) HYDRAULIC CYLINDER, IN PARTICULAR MASTER CYLINDER FOR A HYDRAULIC CLUTCH ACTUATION SYSTEM FOR MOTOR VEHICLES

(75) Inventor: Rudolf Tröster, Lauter (DE)

(73) Assignee: FTE automotive GmbH, Ebern (DE)

( * ) Notice: Subject to any disclaimer, the term of this patent is extended or adjusted under 35 U.S.C. 154(b) by 54 days.

(21) Appl. No.: 11/106,322

(22) Filed: Apr. 14, 2005

(65) Prior Publication Data
US 2005/0229773 A1    Oct. 20, 2005

(30) Foreign Application Priority Data
Apr. 16, 2004   (DE) ................. 20 2004 006 213 U

(51) Int. Cl.
*F15B 7/08*    (2006.01)
(52) U.S. Cl. ........................................... 60/588; 60/589
(58) Field of Classification Search ................. 60/589, 60/588
See application file for complete search history.

(56) References Cited

U.S. PATENT DOCUMENTS 6,584,771 B2    7/2003  Keller et al.
6,769,254 B2 *  8/2004  Heller et al. ................. 60/589
2004/0007125 A1  1/2004  Stobrawe et al.
2004/0065083 A1  4/2004  Rammhofer

FOREIGN PATENT DOCUMENTS

| DE | 196 52 486 A 1 | 6/1998 |
| DE | 199 53 286 A 1 | 5/2001 |
| EP | 1424503 A1 * | 6/2004 |

* cited by examiner

*Primary Examiner*—Igor Kershteyn
(74) *Attorney, Agent, or Firm*—Reising, Ethington, Barnes, Kisselle, P.C.

(57) ABSTRACT

A hydraulic cylinder, in particular a master cylinder for a hydraulic clutch actuation system for motor vehicles, has a housing having a cylinder wall, in which a piston is slidably received to seal off the pressure chamber, whereas the pressure chamber in a rest position of the piston is connected to an after-running region by equalization grooves of an after-running device. The cylinder wall of the housing is provided with profiled cut-outs on its piston-side end at least in a lower region in the installed position of the cylinder, which cut-outs each have an upper boundary surface which in the installed position of the cylinder rises up to the equalization grooves of the after-running device.

13 Claims, 2 Drawing Sheets

HYDRAULIC CYLINDER, IN PARTICULAR MASTER CYLINDER FOR A HYDRAULIC CLUTCH ACTUATION SYSTEM FOR MOTOR VEHICLES

TECHNICAL FIELD

The present invention relates to a hydraulic cylinder. In particular, the invention relates to a master cylinder for a hydraulic clutch actuation system for motor vehicles, as used in motor vehicle construction.

PRIOR ART

A generic hydraulic cylinder is known from U.S. Pat. No. 6,584,771 by the Applicant. In these hydraulic cylinders, a pressure is generated in the pressure chamber when the piston undergoes axial relative displacement with respect to the cylinder housing by virtue of force being exerted by a plunger rod articulated for example on a pedal. By virtue of this pressure, a clutch slave cylinder which is hydraulically connected to the hydraulic cylinder is acted upon, which clutch slave cylinder is effectively connected to the clutch in order to disengage the clutch.

The hydraulic cylinders considered here have a piston— also referred to as a plunger piston on account of its design—with a running surface for (at least) one sealing element, and an after-running device having equalization grooves. The sealing element is attached to the housing of the hydraulic cylinder and serves, in cooperation with the running surface of the piston, to seal off the pressure chamber in an operating position of the piston, that is to say with the piston displaced in the direction of the pressure chamber. The equalization grooves of the after-running device on the other hand, in a rest position, that is to say a position in which the piston is up against a stop, connect the pressure chamber to an after-running region which in turn is connected to an after-running container so that volume fluctuations in the hydraulic fluid are compensated, which volume fluctuations may be caused for example by clutch wear or temperature fluctuations in the system.

Unlike "conventional" pistons or shaft pistons which have at least one sealing element, plunger pistons operate exclusively on the displacement principle on account of the housing-side, that is to say stationary, arrangement of the sealing element. This means that the hydraulic fluid is merely swirled in the pressure chamber when the plunger piston is moved, without significant flow or flushing effects being produced in the pressure chamber, as caused by the piston-side sealing element in "conventional" pistons or shaft pistons. In plunger pistons, therefore, only a small exchange of hydraulic fluid takes place via the equalization grooves of the after-running device to the non-pressurized after-running region. Accordingly, in plunger pistons, few undesirable air or gas bubbles are transported away from the pressure chamber to the after-running region. If, however, the pressure chamber is insufficiently deaerated or degassed, inter alia an undesirable "soft pedal feeling" is produced with a loss of stroke during pedal travel.

In order to ensure better deaeration or degassing of a hydraulic cylinder with a plunger piston, there has already been proposed in the prior art (DE 199 53 286 A1) a hydraulic cylinder the housing of which is provided, in its top wall in the intended installed position of the housing, with a deaerating groove which extends in the longitudinal direction of the housing, the bottom of which deaerating groove is designed to rise, with respect to a horizontal of the intended installation position of the housing, towards a deaerating or after-running channel.

However, it has been shown that such a configuration is unsatisfactory for sufficient deaeration in particular of those hydraulic cylinders in which the plunger piston has at its end an extension which projects into the pressure chamber, for example is provided with a retaining cap which serves to store a signal element, for example a ring magnet for sensing the axial piston position, as known for example from DE 202 08 568 U1 by the Applicant. In order in this case to obtain as great a signal strength as possible, the diameter of the ring magnet must be selected to be as large as possible in terms of its design. This means that only a relatively small annular gap or clearance remains between the retaining cap and the ring magnet on one side and the cylinder wall on the other side. During the operation of filling a hydraulic system comprising such a hydraulic cylinder with hydraulic fluid, it has now been found that the flow or flushing effects in the pressure chamber, which as mentioned above are in any case small in the case of plunger pistons, are limited even more on account of the narrow annular gap or clearance between the retaining cap and the ring magnet and the cylinder wall, respectively, and air collects in finely dispersed bubbles in particular in the lower region of the annular gap or clearance, which bubbles adhere to the cylinder wall and, under the further reduced flow or flushing effects in the pressure chamber, move only extremely slowly in the direction of the after-running device, if at all. Even the configuration of the cylinder housing which is known from DE 196 52 486 A1, comprising an arrangement of longitudinal grooves distributed over the circumference of the cylinder wall, which longitudinal grooves extend into the pressure chamber from the free end of the cylinder wall and continuously taper conically in the radial direction, does not remedy this.

Accordingly, based on the prior art according to U.S. Pat. No. 6,584,771, it is an object of the invention to provide a hydraulic cylinder which is designed in as simple a manner as possible and comprises a plunger piston with an improved deaerating and degassing behavior compared to the outlined prior art.

SUMMARY OF THE INVENTION

According to the invention, in a hydraulic cylinder, in particular a master cylinder for a hydraulic clutch actuation system for motor vehicles, which comprises a housing having a cylinder wall, in which housing a piston is received in a longitudinally displaceable manner, which piston together with the cylinder wall delimits a pressure chamber and has a running surface for a housing-side sealing element which in an operating position of the piston co-operates with the running surface thereof in order to seal off the pressure chamber, which pressure chamber in a rest position of the piston is connected to an after-running region by equalization grooves of an after-running device; the cylinder wall of the housing is provided with profiled cut-outs on its piston-side end at least in a lower region in the installed position of the cylinder, which cut-outs each have an upper boundary surface which in the installed position of the cylinder rises up to the equalization grooves of the after-running device.

According to one fundamental concept of the invention, therefore, (at least) in a region of the hydraulic cylinder which is critical with regard to deaeration or degassing, that is to say a lower region in the installed position of the cylinder at the piston-side end of the cylinder wall of the housing, which particularly in the case of a plunger piston having at the end an extension which projects into the pressure chamber, as known for example from DE 202 08 568 U1, is typically covered in the axial direction by the plunger piston or the extension thereof even in the rest position of the plunger piston, profiled cut-outs are provided which serve to receive fine air or gas bubbles. In this case, the profiled cut-outs act almost as crystallization centers, in which the fine air or gas bubbles can combine to form somewhat larger bubbles of greater lift which thus usually cannot be produced in the annular gap or clearance between the actual cylinder wall and the plunger piston or the extension thereof. Since each profiled cut-out is moreover delimited at the top by a boundary surface which in the installed position of the cylinder rises up towards the equalization grooves of the after-running device, the profiled cut-outs furthermore act as a rising aid for the air or gas bubbles, which can thus easily rise towards the equalization grooves of the after-running device despite the flow or flushing effects in the pressure chamber which as mentioned above are only very small. This therefore ensures, in a conceivably simple manner, better and faster deaeration or degassing of the pressure chamber of the hydraulic cylinder.

Advantageously, the profiled cut-outs, seen in a developed view of the cylinder wall, each have essentially the shape of a triangle, the longest side of which is formed by the respective upper boundary surface. Although other shapes for the profiled cut-outs are also conceivable, the triangular shape is a shape that can be more easily produced in comparison with, for example, profiled cut-outs which have curved boundary surfaces.

In principle, the profiled cut-outs may have lower boundary surfaces which run for example essentially parallel to the upper boundary surfaces, so that the profiled cut-outs on the cylinder wall form a rectangular structure. However, particularly with regard to the manufacturing technology, it is preferable if the profiled cut-outs each have a lower boundary surface which is oriented essentially parallel to the center axis of the cylinder wall of the housing.

If the upper boundary surface and/or the lower boundary surface of each profiled cut-out forms an edge with the cylinder wall of the housing, that is to say no rounded surface transition exists there, at this point the breakaway resistance for air or gas bubbles is advantageously minimized, so that in particular even small bubbles of weak lift can detach more easily from the wall surfaces and rise towards the equalization grooves of the after-running device.

In a further embodiment of the invention, the upper boundary surface and/or the lower boundary surface of each profiled cut-out may advantageously enclose an angle of greater than or equal to 90° with an imaginary tangent placed against the cylinder wall of the housing at right angles to the center axis of the cylinder wall. No undercuts are thus produced here which could make manufacture of the cylinder housing more difficult.

Furthermore, a larger-diameter cylinder section for receiving the housing-side sealing element may adjoin the piston-side end of the cylinder wall of the housing, said larger-diameter cylinder section being connected to the cylinder wall via an annular shoulder and possibly a bevel, wherein the profiled cut-outs may end in the bevel or the annular shoulder. In such an embodiment, the profiled cut-outs are thus advantageously open towards the rear, that is to say in the direction of the piston, and this further promotes the transporting-away of air or gas bubbles in the hydraulic fluid towards the after-running region.

If the profiled cut-outs each have an essentially constant depth, the bottom of the respective profiled cut-out advantageously forms a surface which is curved essentially concentrically with respect to the cylinder wall. Compared to a profiled cut-out with a flat bottom, as may also be conceivable, a receiving volume for air or gas bubbles which is as large as possible is thus provided within a small space.

Continuing the concept of the invention, the profiled cut-outs may be arranged in a mirror-symmetrical manner with respect to an imaginary plane which contains the center axis of the cylinder wall and runs essentially vertically in the installed position of the cylinder, and this ensures equally good dissipation, in both circumferential directions, of air or gas bubbles from the lower region of the pressure chamber in the installed position of the cylinder.

Furthermore, the profiled cut-outs may (all) lie below an imaginary plane which contains the center axis of the cylinder wall and runs essentially horizontally in the installed position of the cylinder, so that the measures according to the invention for improving the deaeration and degassing are provided in the problem area—and only in said problem area.

Finally, although it is conceivable to make the profiled cut-outs by cutting into the cylinder wall of an e.g. metal cylinder housing, it is preferable if the housing is injection-molded from plastic whereby the profiled cut-outs are formed at the piston-side end of the cylinder wall, and this is advantageous inter alia since the cylinder housing can be produced with the profiled cut-outs in the cylinder wall thereof in just one operation.

BRIEF DESCRIPTION OF THE DRAWINGS

The invention is explained in more detail below on the basis of a preferred example of embodiment and with reference to the appended drawings, in which.

DETAILED DESCRIPTION OF AN EXAMPLE OF EMBODIMENT

Figure 1:
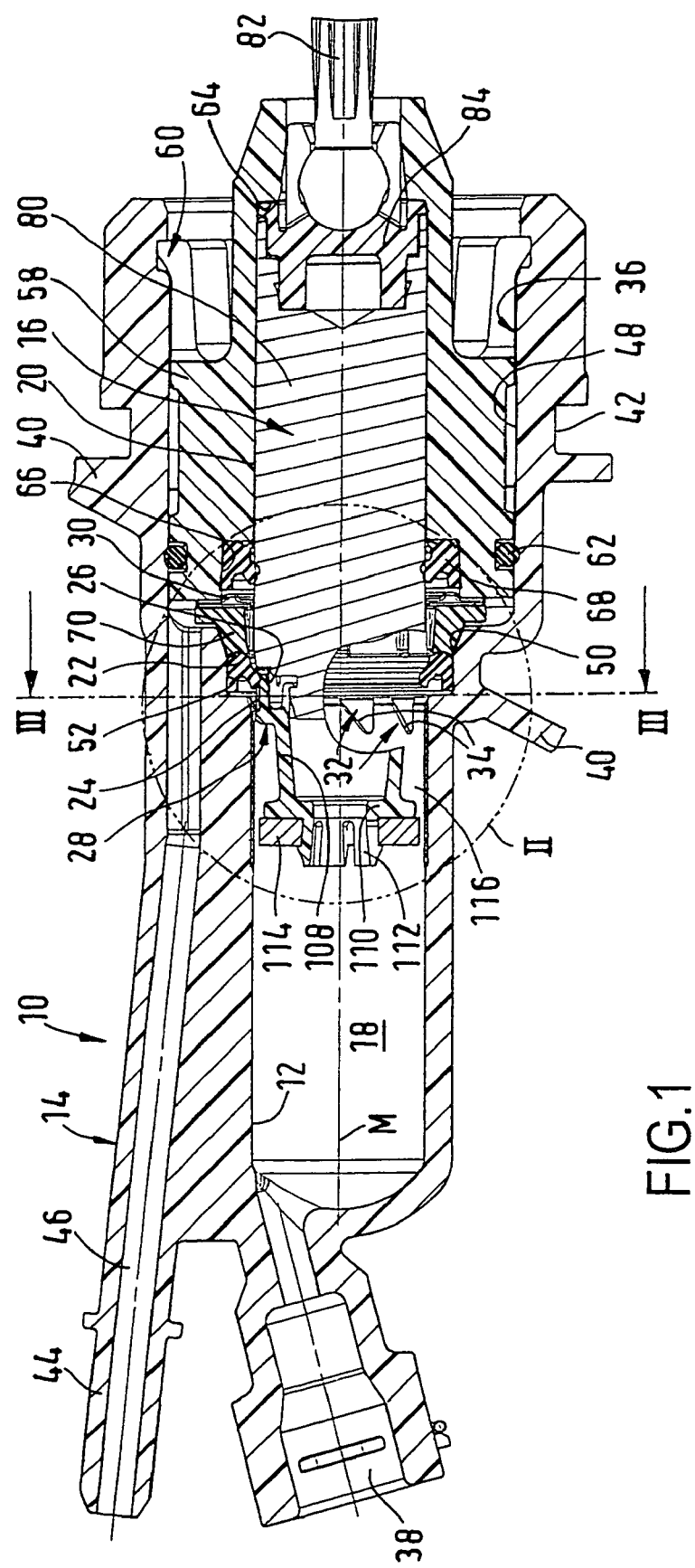
FIG. 1 shows a broken-away and partially opened-up longitudinal sectional view of a master cylinder according to the invention for a hydraulic clutch actuation system for motor vehicles, on a somewhat enlarged scale compared to the real dimensions.
Figure 2:
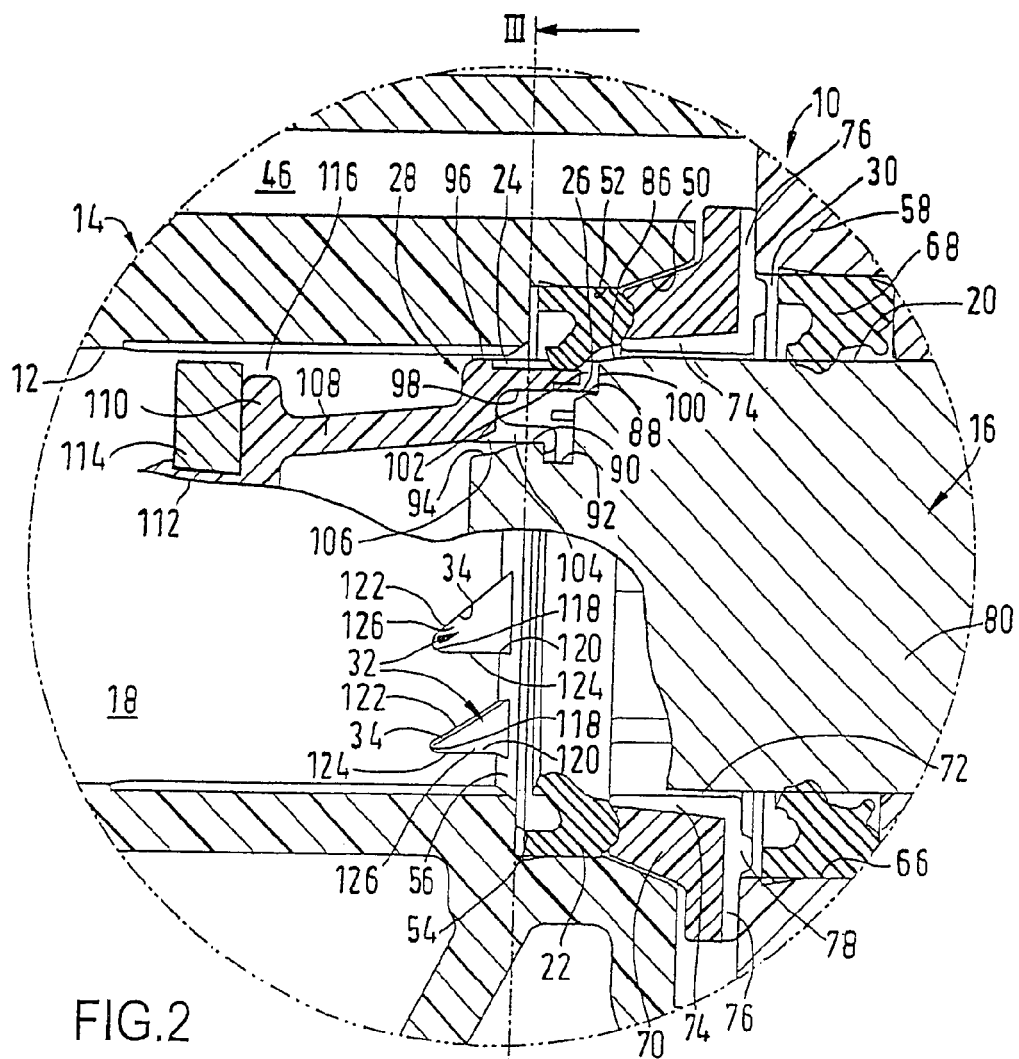
FIG. 2 shows detail II of FIG. 1 on a scale which has been further enlarged compared to FIG. 1.
Figure 3:
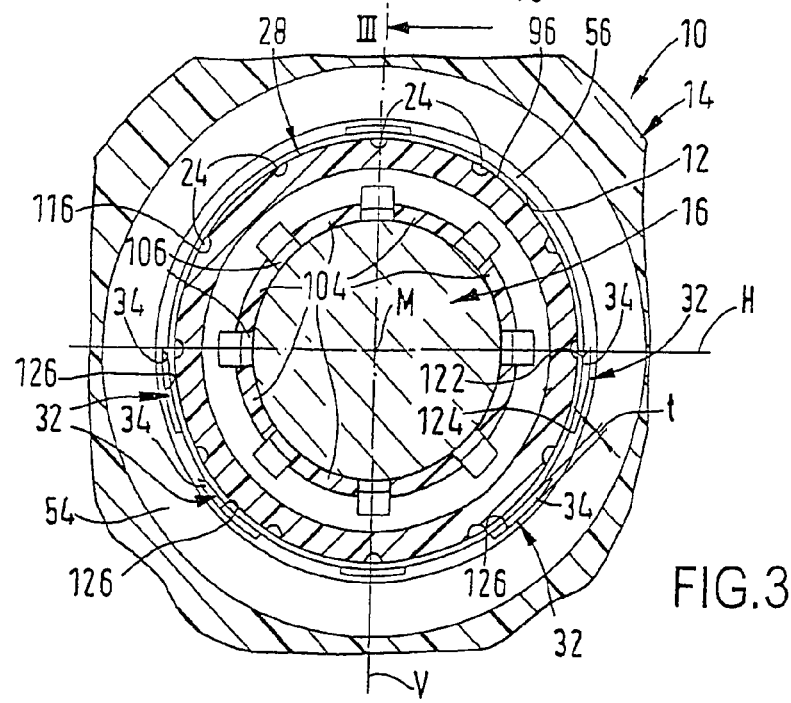
FIG. 3 shows a broken-away sectional view of the master cylinder of FIG. 1 along the section line III—III of FIGS. 1 and 2 on the scale of FIG. 2.

FIGS. 1 to 3 show, by way of example for a hydraulic cylinder, a master cylinder 10 for a hydraulic clutch actuation system for motor vehicles in the uninstalled, non-actuated state. The master cylinder 10 comprises a housing 14 having a cylinder wall 12, in which housing a piston 16 is received in a longitudinally displaceable manner. The piston 16 together with the cylinder wall 12 delimits a pressure chamber 18 in the housing 14 and, as a plunger piston, has a running surface 20 for a housing-side primary sealing element 22 which—like the other rubber-elastic components of the master cylinder 10—is shown in the non-deformed state for the sake of simplicity. In an operating position (not shown) of the piston 16, in which the primary sealing element 22 is located above the running surface 20 of the piston 16, said primary sealing element cooperates with the running surface 20 in order to seal off the pressure chamber 18 so that a pressure can be built up in the pressure chamber 18 as a result of a stroke of the piston 16 to the left in FIGS. 1 and 2. However, in the rest position of the piston 16, which is shown in the figures, the pressure chamber 18 is connected to an after-running region 30 by equalization grooves 24, 26 of an after-running device 28. This connection between the pressure chamber 18 and the after-running region 30, which is brought about by the after-running device 28 and can be interrupted by moving the piston 16 out of the illustrated rest position to the left in FIGS. 1 and 2, serves to bring about pressure equalization between the pressure chamber 18 and the after-running region 30 and to allow the after-running of hydraulic fluid from the after-running region 30 to the pressure chamber 18, and also to allow the escape of air or gas out of the pressure chamber 18 via the after-running region 30. It is essential that, as will be described in more detail below, the cylinder wall 12 of the housing 14 is provided with profiled cut-outs 32 on its piston-side end, i.e. the right-hand end in FIGS. 1 and 2, at least in a lower region in the installed position of the master cylinder 10, which cut-outs each have an upper boundary surface 34 which in the installed position of the master cylinder 10 rises up to the equalization grooves 24, 26 of the after-running device 28, i.e. to the right in FIGS. 1 and 2.

The housing 14, which is preferably injection-molded from plastic whilst forming inter alia the profiled cut-outs 32 at the piston-side end of the cylinder wall 12, has, starting from its right-hand end in FIG. 1, a stepped blind hole 36, at the left-hand end of which in FIG. 1 there is a pressure connection 38 via which the master cylinder 10 can be connected to a slave cylinder (not shown). The housing 14 is furthermore provided, on the outer circumference, with a fixing flange 40, by means of which the master cylinder 10 can be mounted on a splashboard (not shown) of the motor vehicle, a radial groove 42 for receiving an elastic cover (not shown) and an after-running connection 44 via which the master cylinder 10 can be connected to an after-running container (not shown). The after-running connection 44 comprises an after-running channel 46 which opens into the blind hole 36 in the after-running region 30.

The blind hole 36 of the housing 14 forms essentially four functional sections having a diameter which decreases from right to left in FIG. 1. Starting from its right-hand end in FIG. 1, the blind hole 36 first has a first cylindrical section 48, which merges via an annular shoulder and a conical transition section 50 into a second cylindrical section 52, which as shown in FIG. 2 is adjoined, via a further annular shoulder 54 and a bevel 56, by the cylinder wall 12 as third cylindrical section.

In the first cylindrical section 48 of the blind hole 36, a plastic guide sleeve 58 for the piston 16 is fitted by means of a snap-in connection 60. Between the guide sleeve 58 and the housing 14, the master cylinder 10 is sealed off from the atmosphere by a static seal in the form of an O-ring 62. At its right-hand end in FIG. 1, the guide sleeve 58 forms a stop 64 for the piston 16, which prevents the piston 16 from being pulled out of the housing 14. At its left-hand end in FIG. 1, the guide sleeve 58 has on the inner circumference a shoulder 66 which serves to receive a secondary sealing element 68 which continuously bears with its dynamic sealing lip against the running surface 20 of the piston 16, in order to seal off the after-running region 30 from the atmosphere or external environment.

The conical transition section 50 of the blind hole 36 serves to center a supporting ring 70 for the primary sealing element 22, which with its right-hand end in FIGS. 1 and 2 bears against an annular end face of the guide sleeve 58 and is thus fixed in the axial direction of the housing 14. On account of the conical receipt of the supporting ring 70 on the conical transition section 50 of the blind hole 36, an annular gap 72 of defined width is produced between the inner circumferential surface of the supporting ring 70 and the running surface 20 of the piston 16, as shown in FIG. 2. In the region of the annular gap 72, the supporting ring 70 is also provided, on its inner circumference, with a plurality of longitudinal grooves 74 uniformly distributed over the circumference, which longitudinal grooves, seen in cross section, have a wedge shape, i.e. their depth continuously increases in the direction of the secondary sealing element 68, from left to right in FIG. 2. The annular gap 72 and the longitudinal grooves 74 communicate directly with the after-running region 30, which is connected to the after-running channel 46 via radial grooves 76, which radial grooves extend to the longitudinal grooves 74 and then in a radial direction over the right-hand end side of the supporting ring 70 in FIG. 2. The radial grooves 76 in this case also extend through an annular shoulder 78 of the supporting ring 70, which ensures that the secondary sealing element 68 cannot interrupt the hydraulic connection between the after-running region 30 and the after-running channel 46.

The primary sealing element 22 is positioned on the second cylindrical section 52 of the blind hole 36 and kept in a defined manner in this position by the supporting ring 70. Finally, the cylinder wall 12, as the third cylindrical section of the blind hole 36, forms the radial boundary of the pressure chamber 18.

The piston 16 received in the housing 14 comprises a main part 80, in the illustrated example of embodiment in the form of a solid body made of non-ferrous metal, for example an aluminum alloy, on which the running surface 20 for the housing-side sealing elements 22, 68 is provided on the outer circumference. At the right-hand end of the piston 16 in FIG. 1, a piston rod 82 is articulated in an actuation-effective manner by an insertion part 84 attached to the main part 80. In the illustrated rest position of the piston 16, the insertion part 84 bears against the stop 64 of the guide sleeve 58.

At the left-hand end of the piston 16 in FIGS. 1 and 2, the after-running device 28, which in the illustrated example of embodiment is produced separately from the main part 80, is attached to the main part 80 in a play-free manner by a snap-in connection, as known from DE 100 28 673 A1 by the Applicant. The external diameter of the running surface 20 of the main part 80 is slightly greater than the external diameter of the after-running device 28, wherein the main part 80 has an oblique or conical transition section 86 between the running surface 20 and the after-running device 28, as can be seen in FIG. 2. Adjoining the transition section 86 of the main part 80 is a smaller-diameter cylindrical centering shoulder 88 for the after-running device 28. The main part 80 ends with an even smaller-diameter cylindrical shoulder 90 for the after-running device 28, which has a radial groove 92 for attaching the after-running device 28 and is provided at the end with a joining bevel 94 in order to facilitate joining of the after-running device 28 to the main part 80.

With regard to the structure and function of the after-running device 28 which is injection-molded in one piece from plastic, reference should firstly be expressly made at this point to DE 100 28 673 A1 and U.S. Pat. No. 6,584,771, respectively, by the Applicant. As shown in FIG. 2, the after-running device 28 designed as an annular part has an essentially cylindrical outer circumferential surface 96 against which, in the illustrated rest position of the piston 16, the primary sealing element 22 bears with its dynamic sealing lip. As shown in FIG. 3, the outer circumferential surface 96 is provided with a plurality of—in the illustrated example of embodiment twelve—equalization grooves 24 distributed uniformly over the circumference, which equalization grooves, starting from the right-hand end of the after-running device 28 in FIGS. 1 and 2, extend in the axial direction of the after-running device 28, to the extent that, in the illustrated rest position of the piston 16, they project to the left in FIGS. 1 and 2 over the dynamic sealing lip of the primary sealing element 22 and the bevel 56 of the housing 14.

Furthermore, the after-running device 28 shown in FIG. 2 has a cylindrical inner circumferential surface 98, by means of which the after-running device 28 is radially centered on the centering shoulder 88 of the main part 80. The inner circumferential surface 98 is likewise provided with a plurality of—in the illustrated example of embodiment twelve—equalization grooves 26 distributed uniformly over the circumference, which equalization grooves, starting from the right-hand end of the after-running device 28 in FIGS. 1 and 2, extend in the axial direction of the after-running device 28. As shown in particular in FIG. 2, the axial length of the equalization grooves 26 on the inner circumferential surface 98 of the after-running device 28 is greater than the width of the centering shoulder 88 of the main part 80.

Finally, the right-hand end of the after-running device 28 in FIGS. 1 and 2 forms an annular shoulder 100 by means of which the after-running device 28 is supported against the main part 80 in the axial direction in a play-free manner. The annular shoulder 100 is provided with a plurality of—in the illustrated example of embodiment twelve—connecting grooves 102 distributed uniformly over the circumference, which connecting grooves run in the radial direction. As shown in particular in FIG. 2, the connecting grooves 102 in the annular shoulder 100 connect the equalization grooves 24 on the outer circumferential surface 96 to the equalization grooves 26 on the inner circumferential surface 98 of the after-running device 28.

As shown in particular in FIGS. 2 and 3, an inner annular section of the after-running device 28 has a number of slots to form spring tabs 104. Each of the eight spring tabs 104 in the example of embodiment has at its end a radially inwardly protruding lug which, as shown in FIG. 2, when the after-running device 28 is mounted on the main part 80, is in engagement with the radial groove 92 provided on the fixing shoulder 90 of the main part 80. As shown in FIG. 2, the slots between the spring tabs 104 are so deep that, at each slot, a passage 106 remains between the after-running device 28 and the fixing shoulder 90 of the piston main part 80.

In FIGS. 1 and 2, a hollow hub section 108 adjoins the spring tabs 104 to the left, which hollow hub section tapers conically towards the left in FIGS. 1 and 2 until it merges into an annular section 110 which is in turn adjoined by spring tabs 112 on the inner circumference, said spring tabs 112 being provided at their end in each case with a radially outwardly protruding lug. As shown in FIGS. 1 and 2, the annular section 110 forms with the spring tabs 112 a seat for a ring magnet 114, which is releasably held there by the lugs provided on the spring tabs 112 and forms part of a sensor device (not shown in any greater detail) for detecting the axial position of the piston 16 in the housing 14. The after-running device 28 therefore also serves at the same time as a retaining cap for fixing the ring magnet 114 on the piston 16, as known in principle from DE 202 08 568 U1 by the Applicant, to which reference is expressly made in this respect.

It can be seen from the above description that, in the rest position of the piston 16 which is shown in FIGS. 1 and 2, a hydraulic connection exists between the pressure chamber 18 and the after-running region 30. This is ensured on the one hand via the equalization grooves 24 on the outer circumferential surface 96 of the after-running device 28 below the dynamic sealing lip of the primary sealing element 22 and on the other hand via the cavity delimited radially outwards by the spring tabs 112, the annular section 110 and the hub section 108 in the after-running device 28, the passages 106, the annular clearance delimited by the inner circumferential surface 98 radially outwards and the fixing shoulder 90 radially inwards, the equalization grooves 26 on the inner circumferential surface 98 and the connecting grooves 102 on the annular shoulder 100 of the after-running device 28, and also furthermore via the annular gap 72 between the running surface 20 and the supporting ring 70 and the longitudinal grooves 74 on the inner circumference of the supporting ring 70.

The described hydraulic connection between the pressure chamber 18 and the after-running region 30 is interrupted as soon as the piston 16 is moved into an operating position in the direction of the pressure chamber 18, i.e. to the left in FIGS. 1 and 2, wherein the dynamic sealing lip of the primary sealing element 22 comes with its sealing contour over the running surface 20 of the piston 16 and seals off the pressure chamber 18 with respect to the after-running region 30, in order that a pressure can be built up in the pressure chamber 18.

It can furthermore be seen from FIGS. 1 to 3 that an annular gap or annular clearance 116, which is relatively narrow but always communicates with the pressure chamber 18, is delimited radially outwards by the cylinder wall 12 of the housing 14 and radially inwards by the outer circumferential surfaces of the ring magnet 114, of the annular section 110 and of the hub section 108 of the after-running device 28 and also the outer circumferential surface 96 of the after-running device 28. In order to better deaerate or degas this annular clearance 116 in particular in a lower region in the installed position of the master cylinder 10, e.g. when filling the master cylinder 10 with hydraulic fluid, the profiled cut-outs 32 are provided in the cylinder wall 12.

As can be seen in particular from FIG. 2, the profiled cut-outs 32, seen in a developed view of the cylinder wall 12, each have essentially the shape of a triangle, the longest side of which is formed by the respective upper boundary surface 34, which is shown at the top with respect to the center axis M of the cylinder wall 12. By contrast, the lower boundary surface 120 of each profiled cut-out 32, which adjoins the upper boundary surface 34 via a rounded surface section 118, is oriented essentially parallel to the center axis M of the cylinder wall 12 of the housing 14. It can furthermore be seen from FIGS. 1 and 2 that the profiled cut-outs 32 end in the bevel 56 of the blind hole 36 in the housing 14, so that each profiled cut-out 32 is open towards the rear, i.e. towards the right in FIGS. 1 and 2. Towards the front, i.e. towards the left in FIGS. 1 and 2, each of the identically shaped profiled cut-outs 32, in the rest position of the piston 16, extends with its rounded surface section 118 as the foremost surface section to beyond the outer circumferential surface 96 of the after-running device 28.

In the illustrated example of embodiment, the upper boundary surface 34 and the lower boundary surface 120 of each profiled cut-out 32 furthermore enclose an angle of approximately 90° with an imaginary tangent placed against the cylinder wall 12 of the housing 14 at right angles to the center axis M of the cylinder wall 12. In this case, the upper boundary surface 34 and the lower boundary surface 120 of each profiled cut-out 32 forms an edge 122, 124 with the cylinder wall 12 of the housing 14, at which edge even relatively small air or gas bubbles can detach relatively easily from the cylinder wall 12.

In respect of the profiled cut-outs 32, it can furthermore be seen from FIG. 3 that they each have an essentially constant depth t, so that the radially outwardly lying bottom surface 126 of each profiled cut-out 32 in terms of its curvature follows the curvature of the cylinder wall 12 or, in other words, runs concentrically to the cylinder wall 12 with respect to the center axis M. With regard to the arrangement and number of profiled cut-outs 32, it can furthermore be seen from FIG. 3 that the profiled cut-outs 32 are arranged in a mirror-symmetrical manner with respect to an imaginary plane V which contains the center axis M of the cylinder wall 12 and runs essentially vertically in the installed position of the master cylinder 10, wherein in the illustrated example of embodiment two profiled cut-outs 32 are provided one above the other on either side of the vertical plane V. Finally, with regard to the vertical position of the profiled cut-outs 32, it can also be seen that the profiled cut-outs 32, in the illustrated example of embodiment, lie below an imaginary plane H which contains the center axis M of the cylinder wall 12 and runs essentially horizontally in the installed position of the master cylinder 10.

It has already been explained above that the profiled cut-outs 32 serve to receive fine air or gas bubbles which may be present in particular in the lower region of the annular clearance 116. In this case, the profiled cut-outs 32 act almost as crystallization centers, in which the fine air or gas bubbles can combine to form somewhat larger bubbles of greater lift. Since each profiled cut-out 32 is delimited at the top by the upper boundary surface 34 rising towards the equalization grooves 24, 26 of the after-running device 28, the profiled cut-outs 32 furthermore act as a rising aid for the air or gas bubbles, which can thus easily rise towards the equalization grooves 24, 26 of the after-running device 28 in order to be removed from there via the after-running region 30 and the after-running channel 46 to the after-running container (not shown).

In respect of the example of embodiment shown in the figures, it should finally also be noted that the cylinder wall 12 of the housing 14, in order to further improve the deaeration or degassing of the pressure chamber 18, is finally also provided with two deaerating grooves 128 which extend in the axial direction and have an essentially rectangular cross section. Like the profiled cut-outs 32, these deaerating grooves 128, which as shown in FIG. 3 are provided at the topmost and bottommost position in the cylinder wall 12, end in the bevel 56 of the blind hole 36 and in the rest position of the piston 16 extend to the left in FIGS. 1 and 2 to beyond the ring magnet 114 held on the piston 16.

The above description of the invention was given by way of example in respect of a master cylinder 10 of a hydraulic clutch actuation system for motor vehicles. However, it is obvious to the person skilled in the art that the described measures may be used to improve the cylinder deaeration or degassing also on other hydraulic cylinders, e.g. master cylinders for hydraulic brake systems in motor vehicles.

A hydraulic cylinder, in particular a master cylinder for a hydraulic clutch actuation system for motor vehicles, is disclosed, comprising a housing having a cylinder wall, in which housing a piston is received in a longitudinally displaceable manner. The piston together with the cylinder wall delimits a pressure chamber and has a running surface for a housing-side sealing element which in an operating position of the piston cooperates with the running surface thereof in order to seal off the pressure chamber, whereas the pressure chamber in a rest position of the piston is connected to an after-running region by equalization grooves of an after-running device. According to the invention, the cylinder wall of the housing is provided with profiled cut-outs on its piston-side end at least in a lower region in the installed position of the cylinder, which cut-outs each have an upper boundary surface which in the installed position of the cylinder rises up to the equalization grooves of the after-running device. As a result, a hydraulic cylinder of simple design is provided which has an improved deaeration behavior compared to the prior art.

I claim:

1. A hydraulic cylinder, comprising a housing having a cylinder wall, in which housing a piston, having an operating position and a rest position, is received in a longitudinally displaceable manner, which piston together with the cylinder wall delimits a pressure chamber and has a running surface for a housing-side sealing element which in the operating position of the piston co-operates with the running surface thereof in order to seal off the pressure chamber, there being an after-running device and an after-running region, the after-running device having equalization grooves, and the pressure chamber, in the rest position of the piston, being connected to the after-running region by the equalization grooves of the after-running device; wherein the cylinder wall of the housing is provided with profiled cut-outs on its piston-side end at least in a lower region in the installed position of the cylinder, which cut-outs each have two boundary surfaces which, seen in the circumferential direction of the cylinder wall, are located on the sides of the respective cut-out; and a radially outer surface therebetween wherein in the installed position of the cylinder the upper one of the boundary surfaces of each cut-out rises up to the equalization grooves of the after-running device.

2. A hydraulic cylinder according to claim 1, wherein the profiled cut-outs, seen in a developed view of the cylinder wall, each have essentially the shape of a triangle, with a longest side thereof being formed by the respective upper boundary surface.

3. A hydraulic cylinder according to claim 1, wherein the cylinder wall of the housing has a center axis and wherein the profiled cut-outs each have a lower boundary surface which is oriented essentially parallel to the center axis of the cylinder wall of the housing.

4. A hydraulic cylinder according to claim 1, wherein at least one of the upper boundary surface and a lower boundary surface of each profiled cut-out forms an edge with the cylinder wall of the housing.

5. A hydraulic cylinder according to claim 1, wherein at least one of the upper boundary surface and a lower boundary surface of each profiled cut-out encloses an angle of greater than or equal to 90° with an imaginary tangent placed against the cylinder wall of the housing at right angles to the center axis of the cylinder wall.

6. A hydraulic cylinder according to claim 1, wherein a larger-diameter cylinder section for receiving the housing-side sealing element adjoins the piston-side end of the cylinder wall of the housing, said larger-diameter cylinder section being connected to the cylinder wall via an annular shoulder, wherein the profiled cut-outs end in the annular shoulder.

7. A hydraulic cylinder according to claim 1, wherein the profiled cut-outs each have an essentially constant depth.

8. A hydraulic cylinder according to claim 7 wherein the radially outer surface follows the curvature of the cylinder wall with respect to a center axis.

9. A hydraulic cylinder according to claim 1, wherein the profiled cut-outs are arranged in a mirror-symmetrical manner with respect to an imaginary plane which contains the center axis of the cylinder wall and runs essentially vertically in the installed position of the cylinder.

10. A hydraulic cylinder according to claim 1, wherein the profiled cut-outs lie below an imaginary plane which contains the center axis of the cylinder wall and runs essentially horizontally in the installed position of the cylinder.

11. A hydraulic cylinder according to claim 1, wherein the housing is injection-molded from plastic whereby the profiled cut-outs are formed at the piston-side end of the cylinder wall.

12. A hydraulic cylinder, comprising a housing having a cylinder wall, in which housing a piston, having an operating position and a rest position, is received in a longitudinally displaceable manner, which piston together with the cylinder wall delimits a pressure chamber and has a running surface for a housing-side sealing element which in the operating position of the piston co-operates with the running surface thereof in order to seal off the pressure chamber, there being an after-running device and an after-running region, the after-running device having equalization grooves, and the pressure chamber, in the rest position of the piston, being connected to the after-running region by the equalization grooves of the after-running device; wherein the cylinder wall of the housing is provided with profiled cut-outs on its piston-side end at least in a lower region in the installed position of the cylinder, which cut-outs each have two boundary surfaces which, seen in the circumferential direction of the cylinder wall, are located on the sides of the respective cut-out; and a radially outer surface therebetween wherein in the installed position of the cylinder the upper one of the boundary surfaces of each cut-out rises up to the equalization grooves of the after-running device; and wherein a larger-diameter cylinder section for receiving the housing-side sealing element adjoins the piston-side end of the cylinder wall of the housing, said larger-diameter cylinder section being connected to the cylinder wall via an annular shoulder and a bevel, wherein the profiled cut-outs end in one of the bevel and the annular shoulder.

13. A master cylinder for a hydraulic clutch actuation system for motor vehicles, comprising a housing having a cylinder wall, in which housing a piston, having an operating position and a rest position, is received in a longitudinally displaceable manner, which piston together with the cylinder wall delimits a pressure chamber and has a running surface for a housing-side sealing element which in the operating position of the piston co-operates with the running surface thereof in order to seal off the pressure chamber, there being an after-running device and an after-running region, the after-running device having equalization grooves, and the pressure chamber, in the rest position of the piston, being connected to the after-running region by the equalization grooves of the after-running device; wherein the cylinder wall of the housing is provided with profiled cut-outs on its piston-side end at least in a lower region in the installed position of the cylinder, which cut-outs each have two boundary surfaces which, seen in the circumferential direction of the cylinder wall, are located on the sides of the respective cut-out; and a radially outer surface therebetween wherein in the installed position of the cylinder the upper one of the boundary surfaces of each cut-out rises up to the equalization grooves of the after-running device.

* * * * *